United States Patent [19]

Ohota

[11] Patent Number: 4,747,337

[45] Date of Patent: May 31, 1988

[54] ROTARY FLUID CYLINDERS FOR OPERATING CHUCKS

[75] Inventor: Kojiro Ohota, Fukuyama, Japan

[73] Assignee: Kitagawa Iron Works Co., Ltd., Fuchu, Japan

[21] Appl. No.: 829,419

[22] Filed: Feb. 13, 1986

[30] Foreign Application Priority Data

Feb. 18, 1985 [JP] Japan .................... 60-30077

[51] Int. Cl.⁴ ............................................. F15B 11/08
[52] U.S. Cl. ....................................... 91/420; 91/465
[58] Field of Search ................................. 91/420, 465

[56] References Cited

U.S. PATENT DOCUMENTS

| 3,748,968 | 7/1973 | Pinto | 91/420 |
| 3,924,514 | 12/1975 | Parsons et al. | 91/420 |

FOREIGN PATENT DOCUMENTS

| 2123075 | 11/1971 | Fed. Rep. of Germany |
| 2318240 | 10/1973 | Fed. Rep. of Germany |
| 1323241 | 7/1973 | United Kingdom |
| 1442775 | 7/1976 | United Kingdom |

Primary Examiner—William E. Wayner
Attorney, Agent, or Firm—Frishauf, Holtz, Goodman & Woodward

[57] ABSTRACT

In a rotary fluid cylinder for operating a chuck of the type comprising a piston rod, guide rods disposed in parallel with the piston rod, spring biased check valve mechanism and pilot valve mechanism operating the check valve mechanism both contained in each guide rods, there are provided a pair of diametrically opposed annular pistons concentric with the piston rod, guide rods being received in the annular pistons for guiding longitudinal movements thereof, a cylinder head rotatably mounted on the piston rod, a rotary valve connected to the cylinder head for defining cylinders for accommodating the pair of annular pistons, a sleeve rotatably mounted on the rotary valve, and valve means for alternately admitting operating fluid in the opposite sides of each annular piston.

11 Claims, 7 Drawing Sheets

ROTARY FLUID CYLINDERS FOR OPERATING CHUCKS

BACKGROUND OF THE INVENTION

This invention relates to a rotary fluid cylinder suitable for actuating jaws of a chuck utilized in a lathe or the like.

One example of a rotary fluid cylinder for controlling jaws of a chuck utilized in a lathe or the like is disclosed in U.S. Pat. No. 3,748,968. According to this patent, the inside of a cylinder is divided into two chambers and operating oil is alternately admitted into the chambers to reciprocate the piston so as to control the jaws of the chuck. For the purpose of preventing a decrease in the gripping force of the chuck even when the oil pressure decreases abruptly, an oil pressure lock mechanism including a check valve and a pilot valve is provided.

In the oil pressure lock mechanism, a pair of guide rods guiding the reciprocating motion of the piston in the cylinder chambers are constructed as double hollow cylinders and two annular rods are provided to extend into a hollow space between the inner and outer cylinders. One of the annular rods is formed as a spring biased check valve mechanism and the other is formed as a pilot mechanism having an oil passage through which a portion of the operating oil flows thereinto. The two annular rods are disposed to face each other in the axial direction. The inside of the inner cylinder is used as an oil passage for operating oil and is communicated with respective chambers of the cylinder via a space between the inner and outer cylinders and the oil passage in the outer cylinder. As it is necessary to communicate the space between the inner and outer cylinders of one guide rod with one of the cylinder chambers and to communicate the space between the inner and outer cylinders of the other guide rod to the other cylinder chamber, the check valve and the pilot valve should be arranged in opposite positions for each guide rod.

For this reason, in the mechanism described above, the check valve and the pilot valve are extended into the annular space between the inner and outer cylinders so that the construction is complicated and the slide resistance is large, thus requiring a high oil pressure for operating the mechanism. Moreover, due to the double wall construction, the outer diameter of the guide rod becomes large.

Moreover since the pilot mechanism comprising an annular rod formed with a pilot oil passage is disposed in a space between the inner and outer cylinders, in order to ensure necessary cross-sectional area of the oil passage of the operating oil and to increase the pilot ratio, the pressure receiving area of the annular rod must be increased. However, this increases the outer diameters of the guide rods and the cylinder so that the pilot ratio is at most 1:3 due to the construction conditions. With such low pilot ratio, response speed to the variation in the oil pressure of the operating oil becomes slow, thus requiring a long time for operating the chuck.

SUMMARY OF THE INVENTION

It is therefore an object of this invention to provide an improved rotary fluid cylinder for controlling a chuck having a simple construction, and a small cylinder outer diameter, thus miniaturizing the construction, and which can provide a high pilot ratio which results in a quick response to a variation in the fluid pressure.

According to this invention there is provided a rotary fluid cylinder for operating a chuck, comprising a piston rod operatively connected to said chuck, parallel guide rods disposed in the axial direction of the piston rod; check valve mechanisms contained in the guide rods and biased by springs; and pilot valve mechanisms operating the check value mechanisms, the pilot valve mechanisms being formed is members supporting one ends of the guide rods.

DESCRIPTION OF THE PREFERRED EMBODIMENTS

Figure 1:
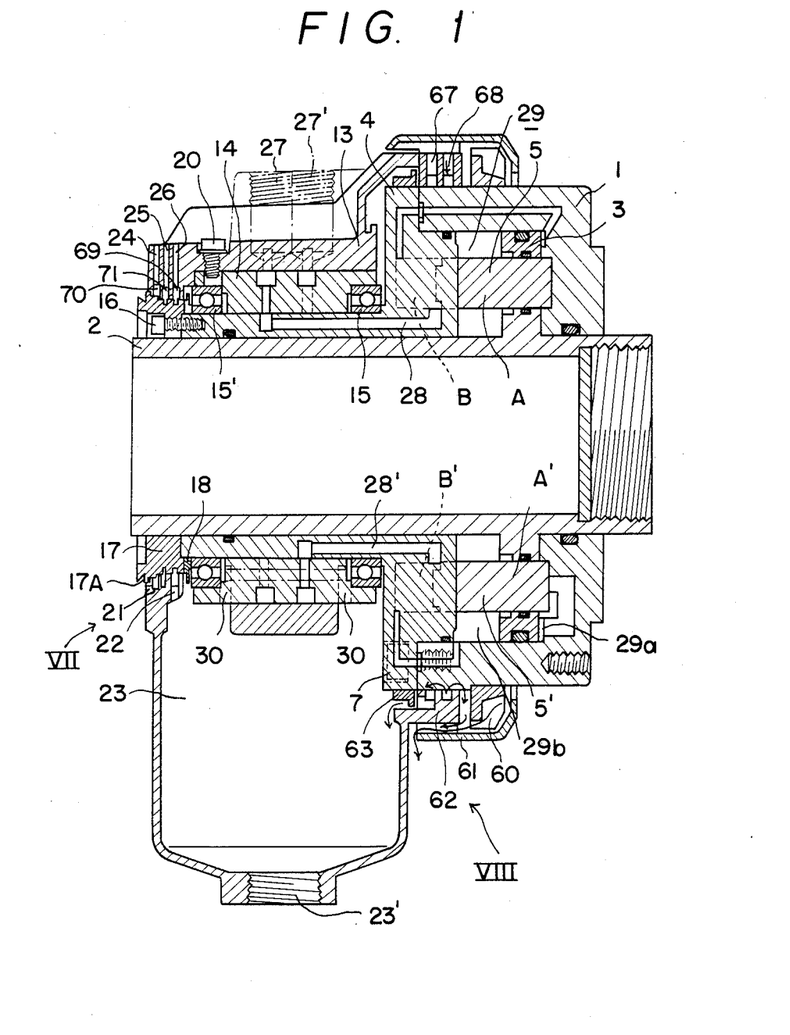
FIG. 1 is a longitudinal sectional view showing one embodiment of the rotary fluid cylinder for operating a chuck.
Figure 2:
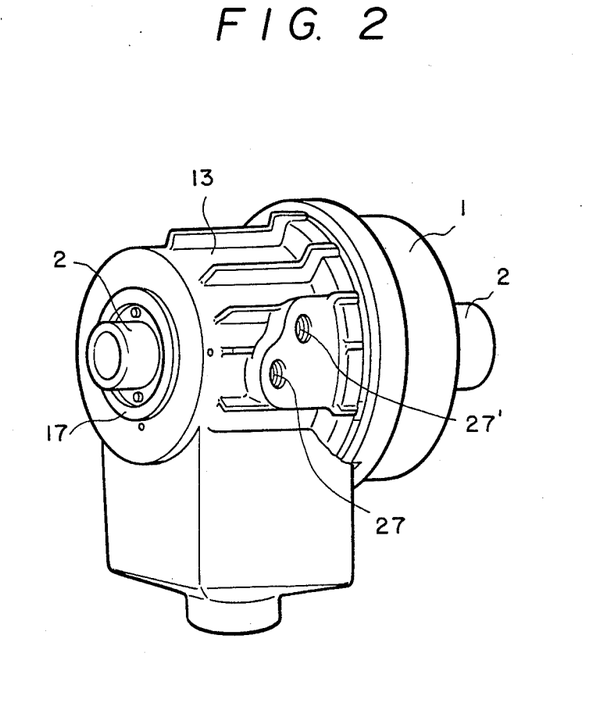
FIG. 2 is a perspective view of the rotary fluid cylinder shown in FIG. 1.

The rotary fluid cylinder shown in FIGS. 1 and 2 is of the type utilizing pressurized oil as the operating fluid. The rotary fluid cylinder comprises a housing made up of a cylinder head 1 and a rotary valve 4 which are connected together by bolts 7, and a piston rod 2 slidably received in the housing and formed with an annular piston 3 on its outer periphery. A cylinder chamber 29 is divided into front and rear cylinder chambers 29a and 29b by the piston 3, and the operating oil is alternately admitted into the cylinder chambers 29a and 29b so as to reciprocate the piston 3 and piston rod 2 for opening and closing the jaws of the chuck through a draw tube, not shown. The forward and rearward motions of the piston rod 2 are guided by a pair of guide rods 5 and 5' which are secured to the cylinder head 1 and the rotary valve 4 at the diametrically opposite positions of the piston 3 such that the guide rods 5 and 5' are parallel in the axial direction of the piston rod 2.

Figure 3:
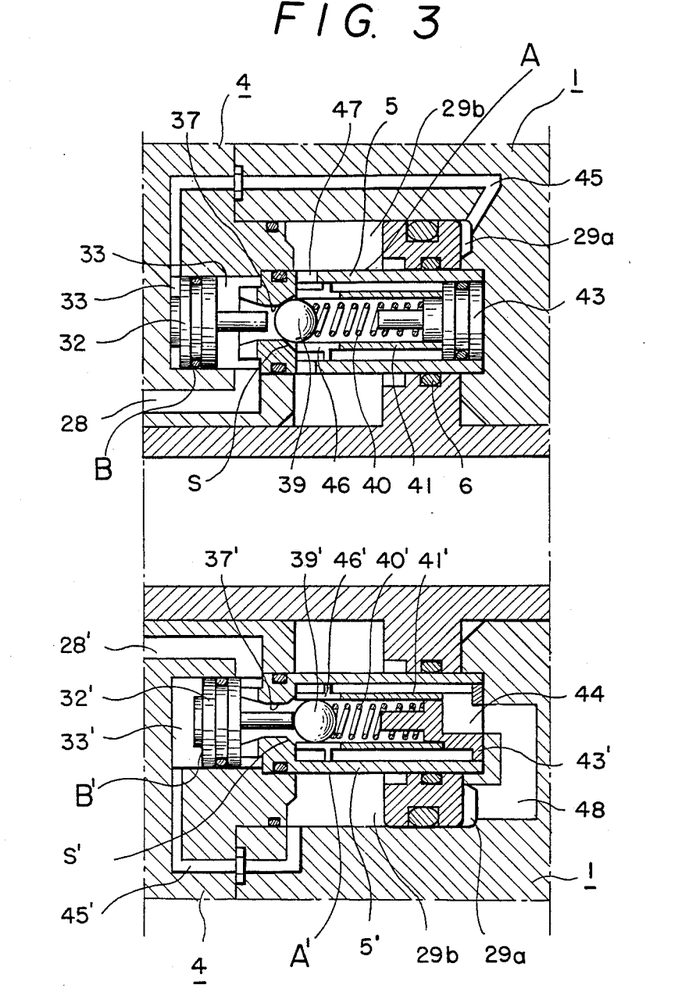
FIG. 3 is an enlarged sectional view showing the pistons in the cylinder.

A sleeve 14 is rotatably mounted on the outer periphery of the rotary valve 4 through a pair of bearings 15 and 15'. The fore end of the sleeve 14 is overlapped on the outer periphery of the cylinder head 1 to surround the same, and the lower end of the sleeve 14 is secured in position by a bolt 20 to a sleeve body 13 formed with a drain reservoir 23 with an opening 23' for external connection. Oil discharge openings 30 opening into the drain reservoir 23 are provided for the sleeve 14. As shown in FIG. 3, valve seats S and S' are provided for the inner walls of the rear side openings of the guide rods 5, 5' supported by the rotary valve 4. Check valve mechanisms A and A' are contained in the housing 1 in which check valves 39 and 39' are urged against the valve seats S and S' by compression springs 40 and 40' contained in guide bushings 41 and 41' respectively supported by retainers 43 and 43' and formed with slots 46 and 46'. The interior of the guide rod 5 is communicated directly with the rear cylinder chamber 29b through an opening 47, while the interior of the guide rod 5' is communicated with the front cylinder chamber 29a via an opening 44 and an oil passage 48 formed in the cylinder head 1.

Within the rotary valve 4 which supports the guide rods 5 and 5' are contained pilot mechanisms B and B' respectively comprising pilot chambers 33 and 33' slidably receiving pilot plungers 32 and 32' disposed coaxially with the check valve mechanisms A and A' in the guide rods 5 and 5' and pilot oil passages 45 and 45' with one end communicated with pilot chambers 33 and 33' and the other ends communicated with the front cylinder chamber 29a and the rear cylinder chamber 29b respectively.

Oil passages 28 and 28' for admitting and discharging the operating oil into and out of the front and rear cylinder chambers 29a and 29b are communicated with corresponding pilot chambers 33 and 33' through guide rods 5 and 5' containing the check valve mechanisms A and A'.

As shown in FIG. 1, the oil passages 28 and 28' are communicated with ports 27 and 27' for external connection formed in the sleeve body 13 through oil passages formed in the sleeve 14, the ports 27 and 27' being connected to a source of pressurized oil, not shown, for admitting and discharging the operating oil into and out of the cylinder chamber 29.

Figure 7:
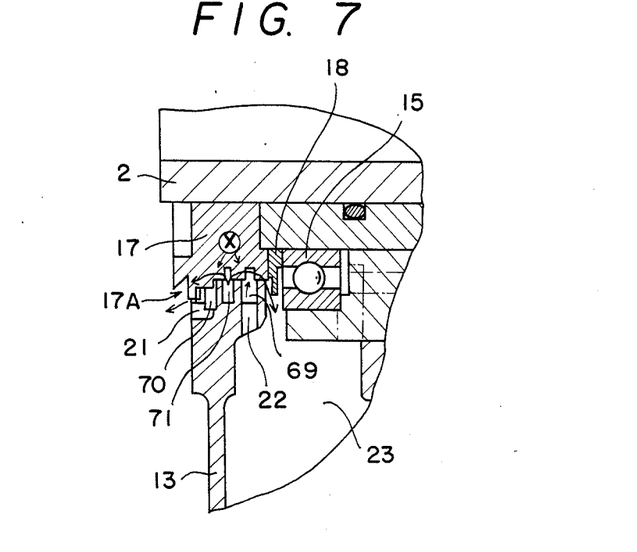
FIG. 7 is an enlarged sectional view showing a portion of FIG. 1 shown by an arrow VII.

As best shown in FIG. 7, the rear end of the rotary valve 4 is fastened to an annular stop member 17 through a flinger 18 with bolts 16. The inner periphery of the stop member 17 and the outer periphery of the sleeve body 13 are corrugated to form a labyrinth seal. With this construction, the oil entering from outside is discharged to outside through an oil discharge groove 2', whereas the oil leaking from inside is collected in the drain reservoir 23 in the sleeve body 13 through an oil discharge groove 22. As shown in FIG. 1, air suction ports 24, 25 and 26 are provided for the sleeve body 13 for readily separating the oil for discharging and recovering by flinging effect afforded by the stop member 17 and the flinger 18. More particularly, as shown in FIG. 7, rotation of a flinged portion 17A of the stop member 17 and flinger 18 relative to the sleeve body 13 creates an air flow as shown by arrows, and since the direction of air flow is reversed at a portion X, an efficient sealing function can be obtained. Thus, the oil entering from 70, outside is discharged through an oil discharge chamber while the oil leaking from inside is discharged through an oil discharge chamber 69. Reference numeral 71 designates an air chamber.

Figure 8:
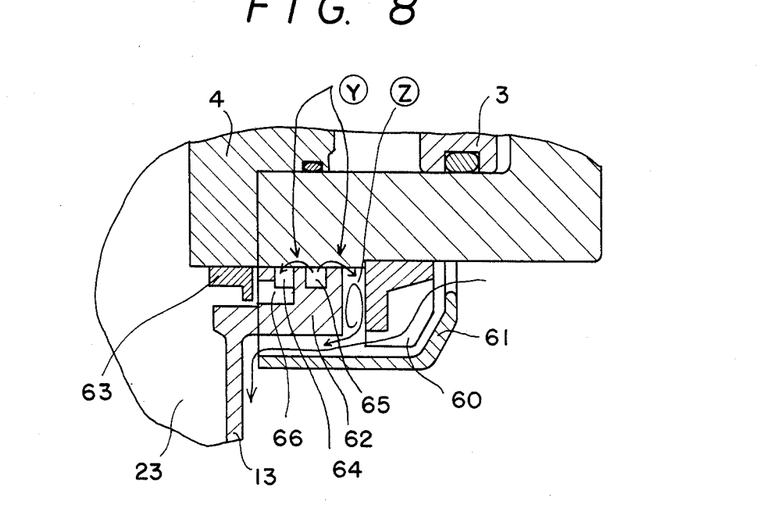
FIG. 8 is an enlarged sectional view showing a portion of FIG. 1 shown by an arrow VIII.

As shown in FIG. 8, a sleeve cover 62 at the front end of the sleeve body 13 is formed with an annular oil discharge chamber 64 and an annular air chamber 65 so that when the cylinder head 1 rotates relative to the sleeve cover 62, an air flow would be created as shown by an arrows and the direction of air reverses at a portion Y thus providing an effective sealing function. Reference numeral 63 represents a flinger, and 66 a communication port interconnecting the drain reservoir 23 and the annular oil discharge chamber 64. With this construction, as a fan 60 rotates, the region Z is evacuated so that the direction of air flow flowing from the drain reservoir 23 toward the fan 60 is changed as shown by an arrow, thus preventing leakage of oil toward the fan 60.

Although in the foregoing embodiment both pilot mechanisms B and B' are formed in the rotary valve 4, it is also possible to dispose either one of the pilot mechanisms in the cylinder head 1 and to reverse by arrange the check valve mechanisms A and A' in the guide rods 5 and 5'.

Figure 4:
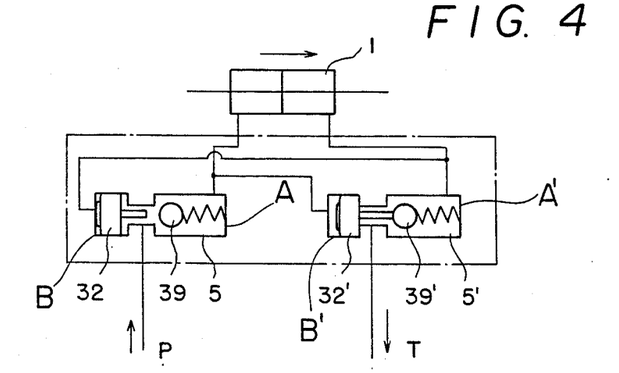
FIG. 4 is a diagrammatic representation useful to explain the operation when the piston is moved in one direction.

With the rotary oil cylinder constructed as above described, when the operating oil is introduced into the pilot chamber 33 of the pilot mechanism B from the port 27 (see FIG. 1) via the oil passage 28, the pilot plunger 32 is moved toward the left as viewed in FIG. 3 while at the same time the check valve 39 is moved away from the valve seat S against the force of the spring 40 so that the operating oil is admitted into the rear cylinder chamber 29b through the opening 37, the slot 46 of the guide rod 5 and the opening 47, whereby the piston 3 is moved to the draw tube side as shown in FIG. 4.

Figure 5:
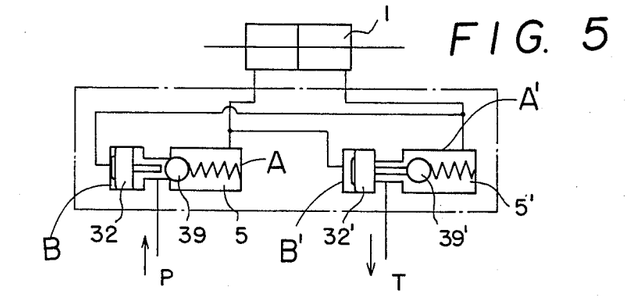
FIG. 5 is a similar representation useful to explain the operation at the time when the piston is stopped.

A portion of the operating oil entering into the rear cylinder chamber 29b is admitted into the pilot chamber 33' via the pilot oil passage 45' so as to move the pilot plunger 32' so as to shift the check valve 39' away from the valve seat S' against the force of the spring 40'. Accordingly, the operating oil in the front cylinder chamber 29a is discharged to the oil passage 28' through the oil passage 48, the opening 44, the slot 46' and the opening 37' of the guide rod 5' and then returned to an oil tank, not shown through the port 27'. As a result, the movement of the piston 3 is stopped as shown in FIG. 5, thus completing an advance stroke.

Figure 6:
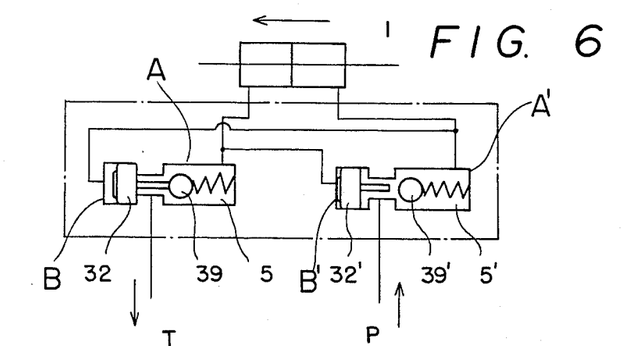
FIG. 6 is a similar representation useful to explain the operation when the piston is moved in the opposite direction.

The return stroke of the piston 3 is effected to switch a transfer valve, not shown, such that the port 27' becomes an inlet port and the port 27 becomes a discharge port so as to pass the operating oil in a direction opposite to that described, thereby moving the piston 3 is a direction shown by an arrow in FIG. 6.

When the operating oil is admitted into the rear cylinder chamber 29b, the jaws of the chuck grip the workpiece and when the piston 3 is maintained at a stop position on the side of the draw tube, supply of the operating oil to the rear cylinder chamber 29b is interrupted. At the same time, check valve 39 is urged against the valve seat S by the force of the spring 40 against the pressure of the operating oil, thereby interrupting the communication between the rear cylinder chamber 29b and the oil passage 28. Accordingly, even when the pressure of the operating oil decreases to zero, the pressure in the rear cylinder chamber 29b would be maintained at a predetermined pressure thus enabling to maintain the piston 3 at a predetermined stop position.

Conversely, when the operating oil is admitted into the front cylinder chamber 29a so as to move and stop piston 3 to a position on the opposite side of the draw tube thus stopping the supply of the operating oil from the external source of the pressurized oil, the check valve 39' is urged against the valve seat S', thus interrupting the communication between the front cylinder chamber 29a and oil passage 28'. Consequently, it is possible to hold the pinston 3 at the predetermined stop position.

Further, it becomes possible to make constant the initial operative pressure of the check valves 39, 39' regardless of the revolutions of the cylinder by making adjustable the resilient force of the spring 40, 40'.

According to the rotary fluid cylinder for operating a chuck of this invention, since a pilot mechanism is formed in a member supporting one end of a guide rod and only a check valve mechanism is contained in the guide rod, it is possible to decrease the diameter and length of the guide rod and the cylinder chamber.

Moreover, since a check valve mechanism in the guide rod is constructed to be closed by a spring, it is possible not only to greatly simplify the construction but also to increase the pressure receiving area of the pilot plunger irrespective of the diameter of the guide rod, so that it is possible to improve the so-called pilot ratio to about 1:7. This increases the response speed to variation in the pressure of the operating oil and thus the speed of chucking and unchucking of the workpiece, thereby shortening the working time.

Since the check valve is guided by guide bushing concentric with the valve seat, even when the piston is operated during rotation of the chuck the check valve would not be displaced in the radial direction so that the seating accuracy of the check valve can be assured.

Due to simplified construction, slide resistance is small so that the check valve mechanism and the pilot mechanism can operate accurately with a low pressure. Moreover, as it is possible to construct the oil cylinder to have small inertia, highly precise gripping force necessary for working a thin workpiece can be provided.

Figure 9:
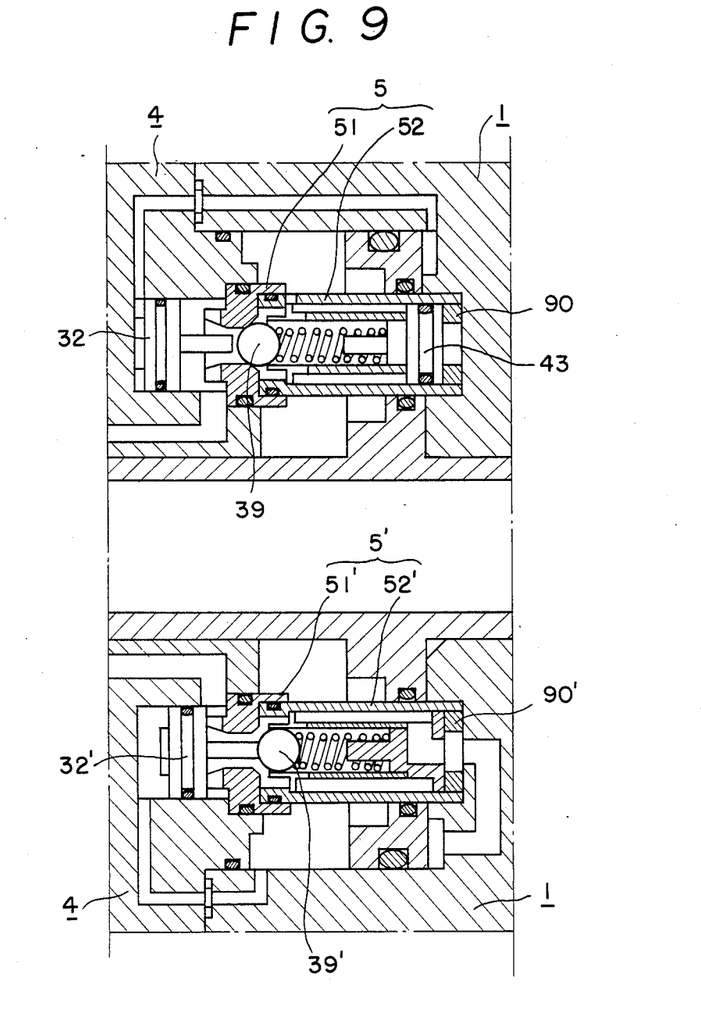
FIGS. 9 and 10 are sectional views showing modified embodiments of this invention.

A modification of this invention is shown in FIG. 9 in which the guide rod 5 is divided into a valve seat member 51 and a cylindrical member 52 supporting the valve seat member 51 at its one end. With this divided construction, it is possible to more accurately work the valve seat thus improving the sealing effect of the check valve. Further, by only exchanging the cylindrical member 52, the mechanism can be applied to cylinders having different strokes. In contrast, when the guide rod has an integral construction, it is necessary to exchange the guide rod as a whole. Where only the cylindrical portion is exchanged, a suitable spacer 90 is used corresponding to the length of the cylindrical portion. Further, with this modification, it becomes possible to desirably change the pilot ratio merely by exchanging the valve seat member 51 to the other one which has the different opening diameter.

Figure 10:
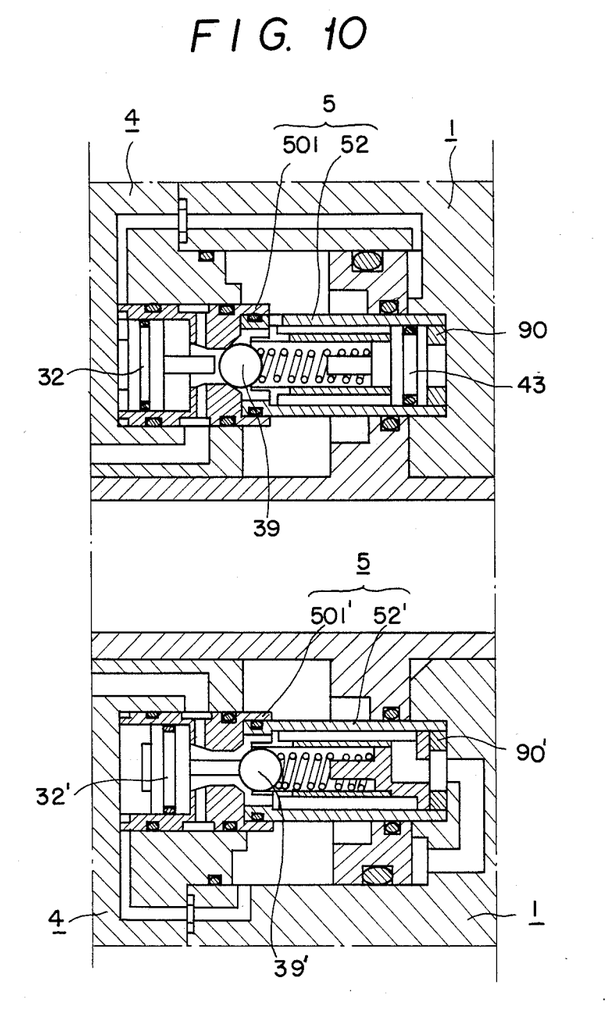

FIG. 10 shows still another modification of this invention in which the valve sheet 51 shown in FIG. 9 is extended to the plunger sliding region. By precisely machining the extended valve seat member 501 the dimensional accuracy of the plunger sliding region can be improved. In contrast, in a construction wherein the plunger 32 is slid along the inner wall of the rotary valve 1, the strain caused by hardening of the inner surface affects the dimensional accuracy.

What is claimed is:

1. A rotary fluid cylinder for operating a chuck, comprising:
    a piston rod adapted to be operatively connected to a chuck;
    at least two substantially parallel guide rods disposed in the axial direction of said piston rod, said guide rods each having opposite ends;
    an annular piston coupled to said piston rod and being arranged substantially concentric with said piston rod, said annular piston being movable with said piston rod in the longitudinal direction of said piston rod, said guide rods being slidably received in said annular piston for guiding longitudinal movements of said annular piston;
    a cylinder housing having a cylinder therein for accommodating said annular piston;
    respective spring biased check valve mechanisms contained in the interior of each of said guide rods;
    said cylinder housing further including support means for supporting at least one end of each of said guide rods;
    pilot valve mechanisms arranged externally of said guide rods and operating said check valve mechanisms of said guide rods, said pilot valve mechanisms being formed in said support means of said cylinder housing, said pilot valve mechanisms each including a respective pilot valve chamber formed in an inner wall portion of said cylinder housing, and a pilot valve plunger means slidably mounted in a respective pilot valve chamber, said pilot valve plunger means each being operatively coupled to a respective check valve mechanism of a respective associated guide rod; and
    fluid passages in said inner wall portion of said cylinder housing for communicating operating fluid to at least said pilot valve chambers.

2. The rotary fluid cylinder according to claim 1, wherein said cylinder housing includes a cylinder head rotatably mounted on said piston rod, and a rotary valve member coupled to said cylinder head.

3. The rotary fluid cylinder according to claim 2, wherein said cylinder is defined at least within said cylinder head.

4. The rotary fluid cylinder according to claim 2, wherein said cylinder housing further comprises a rotatable member rotatably mounted on said rotary valve member.

5. The rotary fluid cylinder according to claim 4, wherein said rotary member comprises a sleeve.

6. The rotary fluid cylinder according to claim 1, wherein said cylinder housing further comprises fluid passage means for alternately admitting operating fluid to opposite sides of said annular piston.

7. The rotary fluid cylinder according to claim 2, wherein:
    each guide rod is hollow and contains therein a said check valve mechanism, said check valve mechanisms each having a check valve seat formed on an inner wall of said guide rod and a check valve member interior of said guide rod, said check valve member being urged against said check valve seat by member means located interior of said guide rod; and
    each guide rod comprises an opening interconnecting an interior portion of said guide rod and an interior portion of said cylinder head.

8. The rotary fluid cylinder according to claim 7, wherein said pilot plunger means of each of said pilot valve mechanisms is arranged to urge said check valve of an associated guide rod against a force of said spring means.

9. The rotary fluid cylinder according to claim 2, further comprising a drain reservoir and a sealing packing formed between said rotary valve member and said drain reservoir.

10. The rotary fluid cylinder according to claim 8, wherein each of said guide rods comprises a hollow cylindrical member and a check valve seat member coupled to said hollow cylindrical member.

11. The rotary fluid cylinder according to claim 10, wherein said check valve seat of said guide rods extend to a region at which said pilot plunger means of an associated pilot valve mechanism engages said check valve mechanism, said check valve seat including means for slidably accommodating said associated pilot plunger means.

* * * * *